US012651577B2

(12) United States Patent
He et al.

(10) Patent No.: US 12,651,577 B2
(45) Date of Patent: Jun. 9, 2026

(54) GATE DRIVE CIRCUIT, DISPLAY PANEL, DISPLAY DEVICE, AND DISPLAY DRIVE METHOD

(71) Applicants: Chengdu BOE Optoelectronics Technology Co., Ltd., Chengdu (CN); BOE Technology Group Co., Ltd., Beijing (CN)

(72) Inventors: Xueying He, Beijing (CN); Mingqiang Wang, Beijing (CN); Zheng Bao, Beijing (CN); Jiaxiang Zhang, Beijing (CN); Xiaoliang Fu, Beijing (CN); Zan Luo, Beijing (CN); Bin Zhang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/859,293

(22) PCT Filed: Jan. 2, 2024

(86) PCT No.: PCT/CN2024/070025
§ 371 (c)(1),
(2) Date: Oct. 23, 2024

(87) PCT Pub. No.: WO2024/159997
PCT Pub. Date: Aug. 8, 2024

(65) Prior Publication Data

US 2025/0316241 A1 Oct. 9, 2025

(30) Foreign Application Priority Data

Jan. 30, 2023 (CN) ......................... 202310103731.8

(51) Int. Cl.
*G09G 3/3275* (2016.01)

(52) U.S. Cl.
CPC .................................. *G09G 3/3275* (2013.01)

(58) Field of Classification Search
CPC ................................................. G09G 3/3275
See application file for complete search history.

(56) References Cited

U.S. PATENT DOCUMENTS 11,790,853 B2 * 10/2023 Jeong .................. G09G 3/3266 345/212
12,260,827 B2 * 3/2025 Roh .................... G09G 3/2003
(Continued)

FOREIGN PATENT DOCUMENTS

CN 100338521 C 9/2007
CN 107358914 A 11/2017
(Continued)

*Primary Examiner* — Ibrahim A Khan
(74) *Attorney, Agent, or Firm* — WHDA, LLP

(57) ABSTRACT

Provided A gate drive circuit includes: a first frame start signal line and a cascade circuit. The first frame start signal line is connected to a first input terminal of the cascade circuit, configured to transmit a first frame start signal to the cascade circuit in a first display stage. The cascade circuit includes shift registers. Each shift register is connected to a clock signal line. An output terminal of each shift register is connected to a writing module in a pixel drive circuit. The cascade circuit is configured to output first scanning signals stage by stage according to the first frame start signal and a clock signal from the clock signal line. The effective level of the first frame start signal in one period overlaps with a plurality of pulse signals of the clock signal. The first scanning signal includes a plurality of scanning pulse signals in one period.

19 Claims, 8 Drawing Sheets

(56) References Cited

U.S. PATENT DOCUMENTS

| | | | | |
|---|---|---|---|---|
| 2015/0061982 | A1* | 3/2015 | Woo | G09G 3/3266 345/82 |
| 2018/0113531 | A1* | 4/2018 | Na | G09G 3/2092 |
| 2018/0158396 | A1* | 6/2018 | Lee | G02B 7/002 |
| 2018/0158409 | A1* | 6/2018 | Byun | G09G 3/3233 |
| 2018/0330672 | A1* | 11/2018 | Park | G09G 3/3225 |
| 2019/0114965 | A1* | 4/2019 | Lim | G09G 3/3233 |
| 2022/0108656 | A1* | 4/2022 | Lee | G09G 3/3275 |

FOREIGN PATENT DOCUMENTS

| | | | |
|---|---|---|---|
| CN | 114566127 | A | 5/2022 |
| CN | 116013198 | A | 4/2023 |

* cited by examiner

GATE DRIVE CIRCUIT, DISPLAY PANEL, DISPLAY DEVICE, AND DISPLAY DRIVE METHOD

CROSS-REFERENCE TO RELATED APPLICATIONS

The present application claims priority to Chinese Patent Application No. 202310103731.8, submitted to the China National Intellectual Property Administration on Jan. 30, 2023, entitled "GATE DRIVE CIRCUIT, DISPLAY PANEL, DISPLAY DEVICE, AND DISPLAY DRIVE METHOD", which is incorporated herein by reference in its entirety.

TECHNICAL FIELD

The present disclosure relates to the field of display technology, and in particular, to a gate drive circuit, a display panel, a display device and a display drive method.

BACKGROUND

In current display devices equipped with Organic Light-Emitting Diode (OLED) screens, when display screens are switched in the display device, the luminance of the first frame is generally low due to the influence of the driving circuit and device structure, which affects the user experience seriously.

SUMMARY

The present disclosure provides a gate drive circuit, including: a first frame start signal line and a cascade circuit;

- wherein the first frame start signal line is connected to a first input terminal of the cascade circuit, and is configured to transmit a first frame start signal to the cascade circuit in a first display stage;
- the cascade circuit includes a plurality of shift registers cascaded with each other, wherein each of the shift registers is connected to a clock signal line, and the output terminal of each of the shift registers is connected to a writing module in a pixel drive circuit; the cascade circuit is configured to output first scanning signals stage by stage according to the first frame start signal and a clock signal input from the clock signal line;
- wherein an effective level of the first frame start signal in one period overlaps with a plurality of pulse signals of the clock signal, and the first scanning signal includes a plurality of scanning pulse signals in one period; the writing module is configured to write a data signal into the pixel drive circuit under based on the first scanning signal.

In some embodiments, the gate drive circuit further includes:

- a second frame start signal line connected to a second input terminal of the cascade circuit, wherein the second frame start signal line is configured to transmit a second frame start signal to the cascade circuit in a second display stage;
- wherein the cascade circuit is further configured to output second scanning signals stage by stage according to the second frame start signal and the clock signal;
- wherein a number of pulse signals of the clock signal that overlap with the effective level of the second frame start signal in one period is less than a number of pulse signals of the clock signal that overlap with the effective level of the first frame start signal in one period, and a number of scanning pulse signals included in the second scanning signal in one period is greater than or equal to 1, and less than a number of scanning pulse signals included in the first scanning signal in one period.

In some embodiments, the first frame start signal line and the second frame start signal line are provided independently, or share a same signal line.

In some embodiments, the number of pulse signals of the clock signal that overlap with the effective level of the first frame start signal in one period is greater than or equal to 2, and less than or equal to 5.

In some embodiments, the effective level of the second frame start signal in one period overlaps with one pulse signal of the clock signal.

In some embodiments, the effective level of the first frame start signal is a low level.

In some embodiments, the effective level of the second frame start signal and the effective level of the first frame start signal are at a same voltage.

In some embodiments, in the cascade circuit, the signal input terminal of a first-stage shift register is connected to the first input terminal and the second input terminal, an output terminal of an E-th-stage shift register is connected to the signal input terminal of an (E+F)th-stage shift register, and the output terminal of a Mth-stage shift register is connected to a reset signal input terminal of a (M−N)th-stage shift register, where $1 \le SE < H$, $F \ge 1$, $E+F \le H$, $1 < M \le H$, $1 \le N < M$, and E, F, H, M and N are all positive integers, and H is a total number of the shift registers in the cascade circuit.

The present disclosure provides a display panel, including:

- a plurality of pixel drive circuits arranged in an array;
- a plurality of light emitting devices, wherein each of the light emitting devices is connected to a pixel drive circuit located in a pixel same as the pixel in which the light emitting device is located;
- a plurality of scanning signal lines, wherein each of the scanning signal lines is connected to scanning signal terminals of the pixel drive circuits located in a same row;
- a plurality of data signal lines, wherein each of the data signal line is connected to data signal terminals of the pixel drive circuit located in a same column; and
- the gate drive circuit according to any embodiments, wherein output terminals of the plurality of shift registers in the cascade circuit are respectively connected to different scanning signal lines;
- wherein the pixel drive circuit is configured to: write a data signal of the data signal terminal into the pixel drive circuit according to a signal of the scanning signal terminal, so as to drive the light emitting device to emit light.

In some embodiments, the plurality of data signal lines includes a first data signal line and a second data signal line, the display panel further includes a signal terminal, a first data selection circuit and a second data selection circuit, the first data signal line is connected to the signal terminal through the first data selection circuit, and the second data signal line is connected to the signal terminal through the second data selection circuit.

In some embodiments, the pixel drive circuit includes:

- a writing module, connected to the data signal terminal, a first node and the scanning signal terminal, and configured to: in a compensation stage, write the data signal into the first node in response to a signal of the scanning signal terminal;

a driving module, connected to the first node, a second node and a third node, and configured to write the signal of the first node into the second node based on a potential of the third node;

a compensation module, connected to the second node, the third node and the scanning signal terminal, and configured to: in the compensation stage, write a signal of the second node into the third node according to the signal of the scanning signal terminal; and an emission control module, connected to a first voltage terminal, an enabling signal terminal, the first node, the second node, and the light emitting device, and configured to: in an emission stage, cooperate with the driving module according to an enabling signal of the enabling signal terminal to drive the light emitting device to emit light;

a storage module, connected to the first voltage terminal and the third node, and configured to store a signal of the third node;

a first reset module, connected to the third node, the first reset signal terminal and a reset control signal terminal, and configured to: write a signal of the first reset signal terminal into the third node according to a signal of the reset control signal terminal; and a second reset module, connected to an anode of the light emitting device, a second reset signal terminal, and the scanning signal terminal, and configured to write a signal of the second reset signal terminal into the anode of the light emitting device according to the signal of the scanning signal terminal.

In some embodiments, among a plurality of consecutive frames of a same picture displayed on the display panel, a ratio of luminance of a first frame to the luminance of a preset frame is a first frame ratio, the first frame ratio is greater than or equal to 85%, and the preset frame is any frame displayed after the same picture is stably displayed.

The present disclosure provides a display device, including:

the display panel according to any embodiment; and a display driving chip, connected to the display panel, and configured to provide driving signals to the display panel, wherein the driving signals include the first frame start signal, the clock signal, and the data signal.

The present disclosure provides a display drive method, applied to the display panel according to any embodiment, the display drive method including:

providing a clock signal to the clock signal line, and transmitting the clock signal to the shift register by the clock signal line;

in a first display stage, providing a first frame start signal to the first frame start signal line, and transmitting the first frame start signal to the cascade circuit by the first frame start signal line, so that the cascade circuit outputs the first scanning signals stage by stage according to the first frame start signal and the clock signal.

In some embodiments, when the gate drive circuit further includes a second frame start signal line, and the second frame start signal line is connected to a second input terminal of the cascade circuit, after providing a clock signal to the clock signal line, the method further includes a second display stage, in the second display stage, providing a second frame start signal to the second frame start signal line, and transmitting the second frame start signal to the cascade circuit by the second frame start signal line, so that the cascade circuit outputs second scanning signals stage by stage according to the second frame start signal and the clock signal.

In some embodiments, before providing the first frame start signal to the first frame start signal line and providing the second frame start signal to the second frame start signal line, the method further includes:

obtaining display data, wherein the display data includes display data of a previous frame of and display data of a next frame, and the display data of the previous frame and the display data of the next frame are display data of two adjacent frames of pictures;

comparing the display data of the previous frame with the display data of the next frame, and executing steps in the first display stage or steps in the second display stage according to a comparison result.

In some embodiments, the executing steps in the first display stage or steps in the second display stage according to a comparison result includes:

in response to the display data of the previous frame being different from the display data of the next frame, executing the steps in the first display stage;

in response to the display data of the previous frame being the same as the display data of the next frame, executing the steps in the second display stage.

In some embodiments, the first scanning signal includes a plurality of scanning pulse signals, the plurality of scanning signal lines includes a first scanning signal line, the plurality of data signal lines include a first data signal line, a pixel drive circuit connected to the first scanning signal line and the first data signal line is a first pixel drive circuit, and after the step, in which providing the first frame start signal to the first frame start signal line, and transmitting the first frame start signal to the cascade circuit by the first frame start signal line, so that the cascade circuit outputs the first scanning signals stage by stage according to the first frame start signal and the clock signal, the method further includes a plurality of compensation stages spaced apart from each other, in each of the compensation stages, providing the scanning pulse signal to the scanning signal terminal of the first pixel drive circuit, and providing a data signal to the data signal terminal of the first pixel drive circuit, so that the data signal is written into the first pixel drive circuit.

In some embodiments, the plurality of data signal lines further includes a second data signal line, the display panel further includes a signal terminal, a first data selection circuit and a second data selection circuit, the first data signal line is connected to the signal terminal through the first data selection circuit, and the second data signal line is connected to the signal terminal through the second data selection circuit, before each of the compensation stages, the method further includes:

providing the data signal to the signal terminal to control the first data selection circuit to be turned on and control the second data selection circuit to be turned off, so that the data signal is written into a first data storage capacitor, wherein one electrode plate of the first data storage capacitor is connected to the first data signal line.

In some embodiments, when the first pixel drive circuit includes a writing module, a driving module, a compensation module, an emission control module and a first reset module, and the writing module is connected to the data signal terminal, the first node and the scanning signal terminal; the driving module is connected to the first node, the second node and the third node, the compensation module is connected to the second node, the third node and the scanning signal terminal, the emission control module is connected to the first voltage terminal, the enabling signal terminal, the first node, the second node and the light emitting device, and the first reset module is connected to the third node, the first reset signal terminal and the reset control signal terminal, the compensation stages are used for sequentially writing the data signal into the first node, the second node and the third node, and before each of the compensation stages, the method further includes a reset stage,

- in a reset stage, providing a first reset signal to the first reset signal terminal, and providing a reset control signal to the reset control signal terminal, so that the first reset signal is written into the third node;
- after the plurality of compensation stages, the method further includes an emission stage,
- in the emission stage, providing an enabling signal to the enabling signal terminal, so that the emission control module cooperates with the driving module to drive the light emitting device to emit light.

The above description is merely a summary of the technical solutions of the present disclosure. In order to make the technical means of the present disclosure more clearly understood and can be implemented in accordance with the contents of the specification, and in order to make the above and other objects, features, and advantages of the present disclosure more apparent, specific implementations of the present disclosure are set forth below.

BRIEF DESCRIPTION OF THE DRAWINGS

In order to describe technical solutions of the embodiments of the present disclosure or the related art more clearly, the accompanying drawings used in the illustration of the embodiments or the related art will be briefly introduced. Apparently, the accompanying drawings in the following explanation illustrate merely some embodiments of the present disclosure, and those skilled in the art may obtain other accompanying drawings based on these accompanying drawings without paying any creative effort. It should be noted that the scales shown in the drawings are indicative only and do not represent actual scales.

DETAILED DESCRIPTION

In order to make objects, solutions and advantages of embodiments of the present disclosure clearer, a clear and thorough description for technical solutions in the embodiments of the present disclosure will be given below in conjunction with the accompanying drawings in the embodiments of the present disclosure. Apparently, the described embodiments are a part of embodiments of the present disclosure, not all the embodiments. All other embodiments obtained, based on the embodiments in the present disclosure, by those skilled in the art without paying creative effort fall within the protection scope of the present disclosure.

In the actual use process, the OLED display screen is often in a state of looping video playback. Due to the influence of the driving circuit and device structure, when the display image is switched in the display screen, the luminance of the first frame is usually only 60% of the required luminance. A sensitive human eye will see a ghosting on the first frame after the image is switched. Usually, the first frame response or the first frame ratio (FFR) is used to represent this phenomenon. The higher the FFR value, the less obvious the ghosting.

Figure 1:
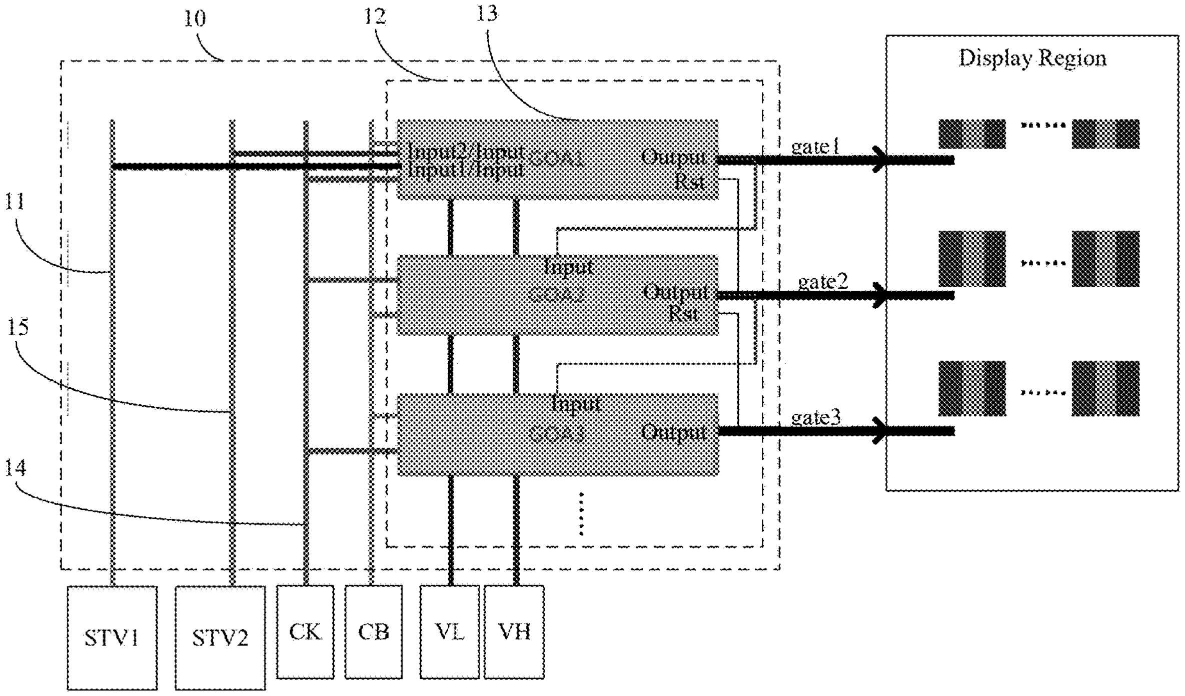
FIG. 1 is a schematic structural diagram of a gate drive circuit provided by the present disclosure.
Figure 2A:
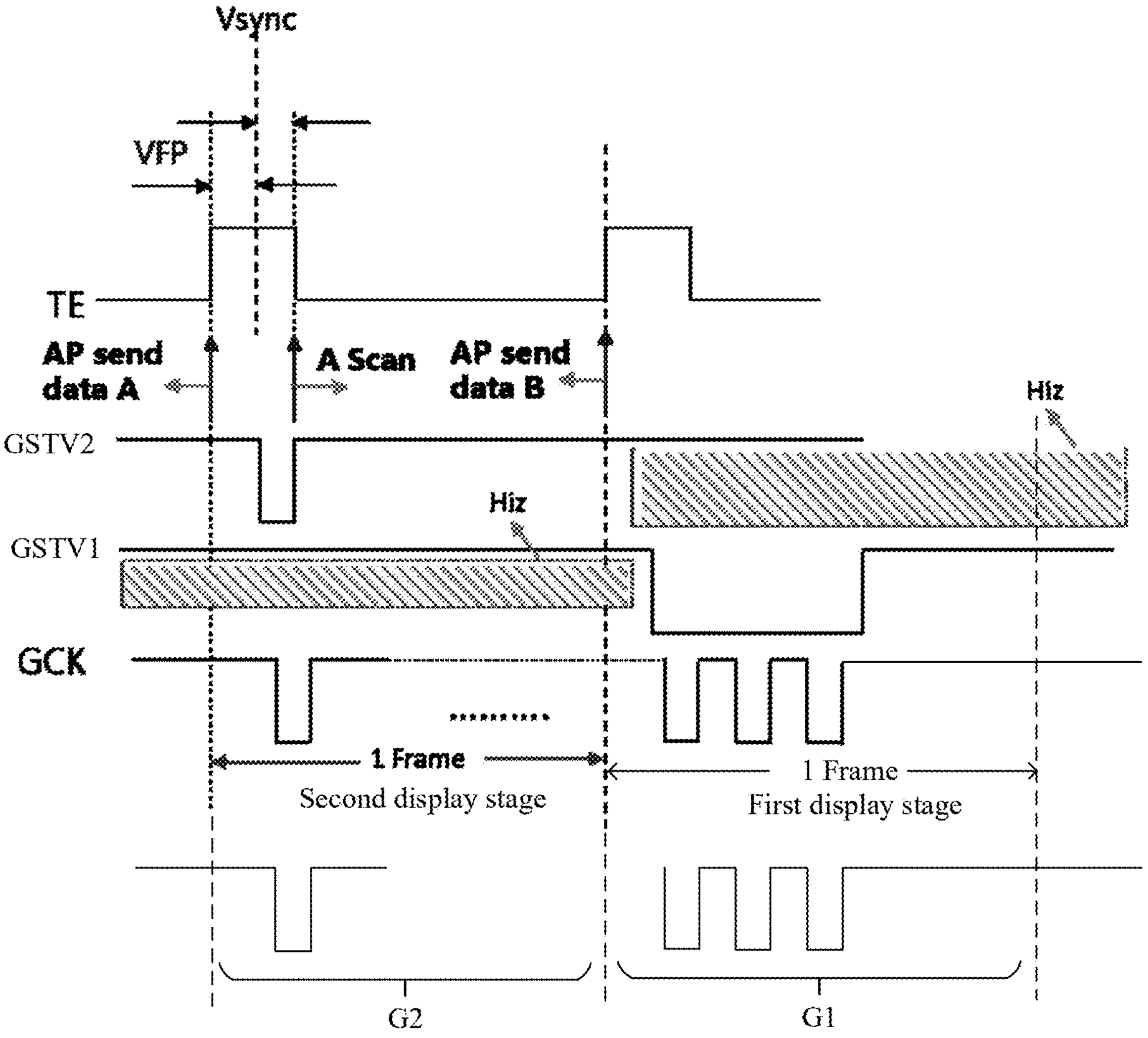
FIG. 2*a* is a sequence chart of driving signals of a gate drive circuit.

The present disclosure provides a gate drive circuit. As shown in FIG. 1 and FIG. 2*a*, the gate drive circuit includes a first frame start signal line 11 and a cascade circuit 12. The first frame start signal line 11 is connected to a first input terminal "Input1" of the cascade circuit 12, and the first frame start signal line 11 is configured to transmit a first frame start signal GSTV1 to the cascade circuit 12 in a first display stage. The cascade circuit 12 includes a plurality of shift registers 13 that are cascaded with each other, and the shift registers 13 are connected to a clock signal line 14 respectively. The cascade circuit 12 is configured to: output first scanning signals G1 stage by stage according to the first frame start signal GSTV1 and the clock signal GCK input from the clock signal line 14.

As shown in FIG. 2*a*, an effective level of the first frame start signal GSTV1 in one period overlaps with a plurality of pulse signals of the clock signal GCK, and the first scanning signal G1 includes a plurality of scanning pulse signals in one period.

In the present disclosure, "one period" refers to one frame period (1 Frame as shown in FIG. 2*a*), that is, a display period of each frame when the display panel displays a plurality of frames, which is the reciprocal of the refresh frequency of the display panel.

Figure 5:
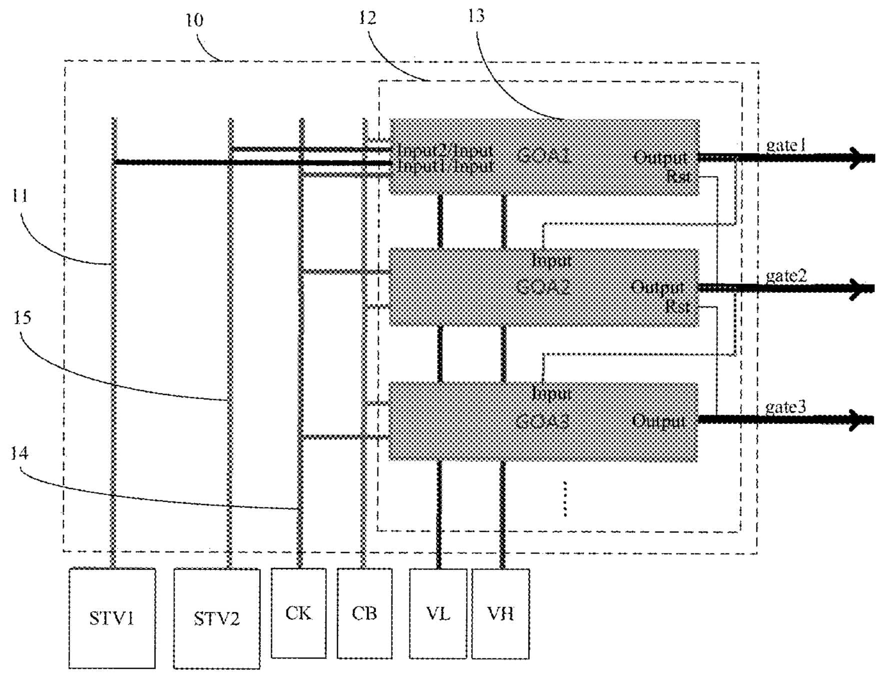
FIG. 5 is a schematic structural diagram of a display panel provided by the present disclosure.
Figure 5:
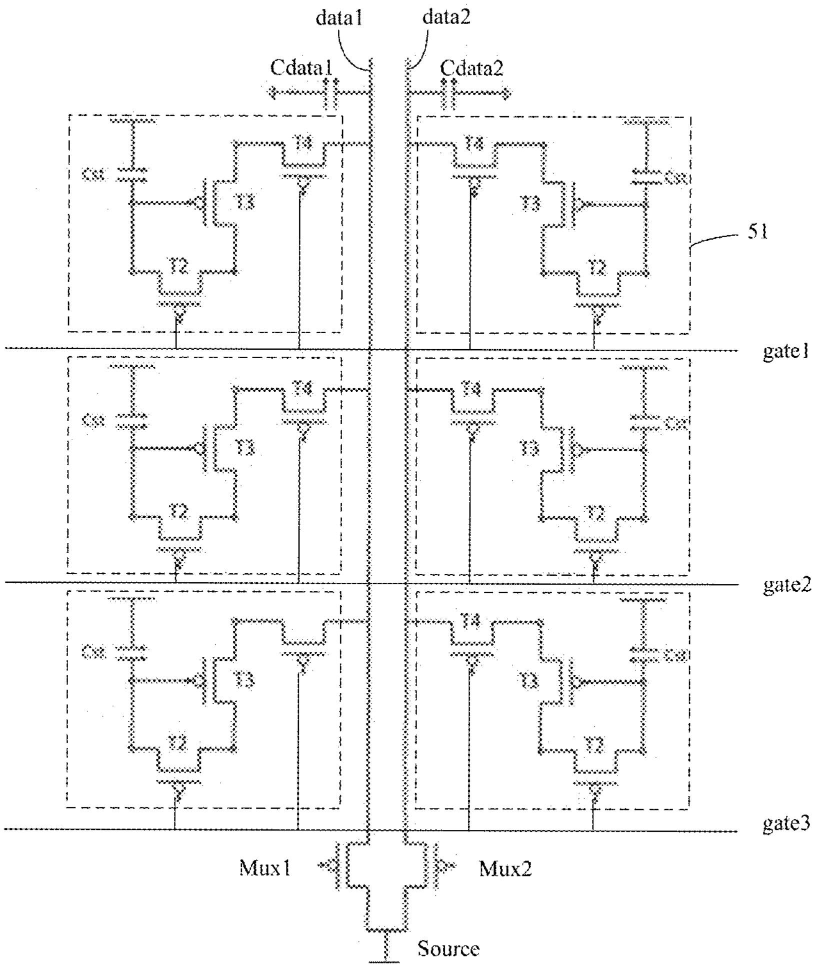
Figure 8:
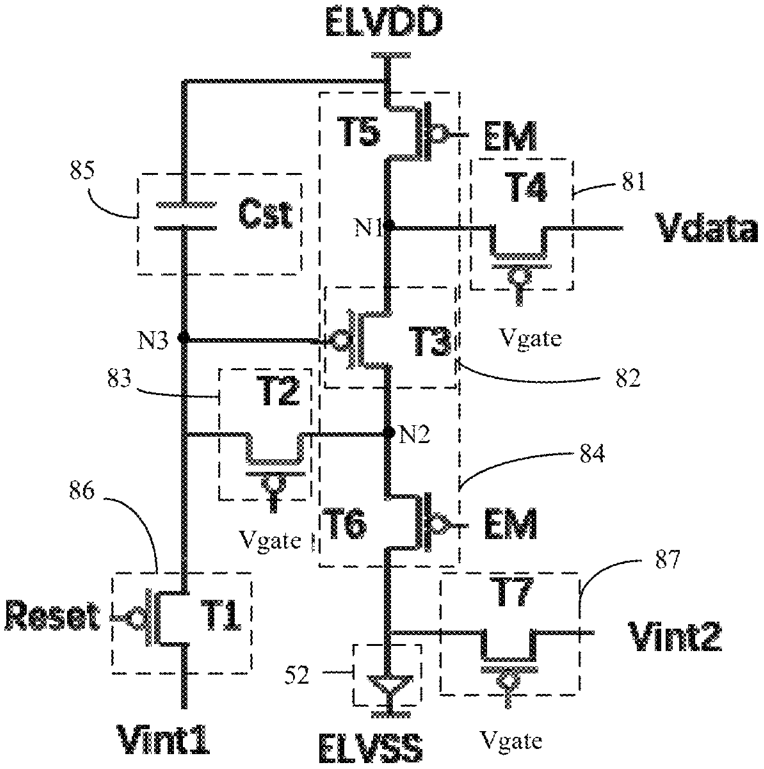
FIG. 8 is a schematic structural diagram of a pixel drive circuit provided by the present disclosure.

Referring to FIG. 5 and FIG. 8, an output terminal "Output" of the shift register 13 may be connected to a writing module 81 in a pixel drive circuit 51 through a scanning signal line "gate". The scanning signal line "gate" is connected to a scanning signal terminal "Vgate" of the writing module 81, and the writing module 81 is configured to write a data signal into the pixel drive circuit 51 based on the first scanning signal G1.

For example, in FIG. 2*a*, the effective level of the first frame start signal GSTV1 in one period overlaps with three pulse signals of the clock signal GCK.

In some embodiments, the number of pulse signals in the clock signal GCK that overlap with the effective level of the first frame start signal GSTV1 in one period is greater than or equal to 2, and less than or equal to 5. As shown in FIG.

2*a*, the number of pulse signals in the clock signal GCK that overlap with the effective level of the first frame start signal GSTV1 in one period is 3.

In some embodiments, as shown in FIG. 2*a*, the effective level of the first frame start signal GSTV1 is a low level.

For example, in the cascade circuit 12, the input terminal "Input" of the first-stage shift register GOA1 is connected to the first input terminal "Input1" of the cascade circuit 12, or multiplexed as the first input terminal "Input1" of the cascade circuit 12 (as shown in FIG. 1).

In some embodiments, in the cascade circuit 12, the output terminal "Output" of the E-th stage shift register 13 is connected to the input terminal "Input" of the (E+F)-th stage shift register 13, and the output terminal "Output" of the M-th stage shift register 13 is connected to a reset terminal "Rst" of the (M−N)-th stage shift register 13, where 1≤E<H, F≥1, E+F≤H, 1<M≤H, 1≤N<M, and E, F, H, M, and N are all positive integers, and H is the total number of shift registers 13 in the cascade circuit 12.

For example, as shown in FIG. 1, F=N=1. In FIG. 1, for each stage of the shift register 13, the output first scanning signal G1 may be output to the scanning signal line "gate", and may also be used as the start signal for the next stage of the shift register 13 and the reset signal for the previous stage of the shift register 13. In the first display stage, the start signal of the first-stage shift register GOA1 is the first frame start signal GSTV1, the first-stage shift register GOA1 may not output a reset signal, and the last stage of the shift register 13 may be connected to a row of redundant shift registers 13 to reset the last stage of the shift register 13.

Figure 2B:
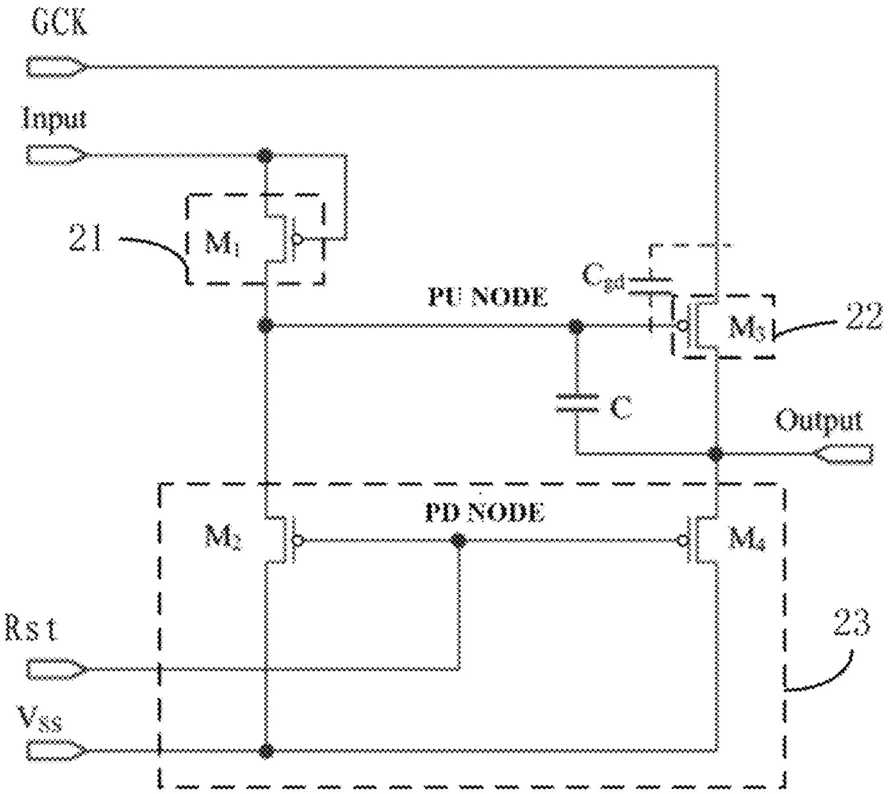
FIG. 2*b* is a schematic diagram illustrating a circuit structure of a shift register.

For example, as shown in FIG. 2*b*, the shift register 13 may include a charging module 21, an output module 22, a storage capacitor C, and a reset module 23. The charging module 21 is respectively connected to the input terminal "Input" of the shift register 13 and a pull-up node PU, and is configured to write the signal of the input terminal "Input" into the pull-up node PU according to the signal of the input terminal "Input". The output module 22 is connected to the clock signal input terminal "GCK", the pull-up node PU, and the output terminal "Output" respectively, and is configured to write the clock signal of the clock signal input terminal "GCK" into the output terminal "Output" according to the potential of the pull-up node PU. The storage capacitor C is connected between the pull-up node PU and the output terminal "Output", and is configured to store the voltage of the pull-up node PU. The reset module 23 is connected to a reset terminal "Rst", a reset signal terminal VSS, the pull-up node PU, and the output terminal "Output" respectively, and is configured to write the signal of the reset signal terminal VSS into the pull-up node PU and the output terminal "Output" according to the signal of the reset terminal "Rst".

As shown in FIG. 2*b*, the charging module 21 includes a transistor M1, a control electrode and a first electrode of the transistor M1 are connected to the input terminal "Input" of the shift register 13, and a second electrode of the transistor M1 is connected to the pull-up node PU. The output module 22 includes a transistor M3, a control electrode of the transistor M3 is connected to the pull-up node PU, a first electrode of the transistor M3 is connected to the clock signal input terminal GCK, and a second electrode of the transistor M3 is connected to the output terminal "Output" of the shift register 13. The reset module 23 includes transistors M2 and M4, the control electrode of the transistor M2 is connected to a pull-down node PD, the first electrode of the transistor M2 is connected to the reset signal terminal VSS, the second electrode of the transistor M2 is connected to the pull-up node PU, the control electrode of the transistor M4 is connected to the pull-down node PD, the first electrode of the transistor M4 is connected to the reset signal terminal VSS, and the second electrode of the transistor M4 is connected to the output terminal "Output". In FIG. 2*b*, transistors M1 to M4 are all P-type transistors.

As shown in FIG. 2*a*, in the first display stage, the first frame start signal line 11 provides the first frame start signal GSTV1 to the input terminal of the first-stage shift register GOA1. As shown in FIG. 2*b*, when the input terminal "Input" of the first-stage shift register GOA1 is connected to the first frame start signal GSTV1 at a low level, the transistor M1 is turned on, the potential of the pull-up node PU is a low level, and the transistor M3 is also turned on, so that the signal of the clock signal input terminal GCK is written into the output terminal "Output", thus the first scanning signal is output. As shown in FIG. 2*a*, since the effective level stage (the low level stage as shown in FIG. 2*a*) of the first frame start signal GSTV1 in one period overlaps with three pulse signals of the clock signal GCK, the first scanning signal output by the output terminal "Output" includes three scanning pulse signals in one period.

In this way, under the action of the first frame start signal GSTV1 and the clock signal GCK, the cascade circuit 12 generates the first scanning signal G1 with a plurality of pulses stage by stage. In the cascade circuit 12, the working process of each stage of the shift register 13 following the first-stage shift register GOA1 is similar to that of the first-stage shift register GOA1, and will not be elaborated here. As can be understood, the number of pulse signals of the clock signal GCK that overlap with the effective level of the first frame start signal GSTV1 in one period is the same as the number of scanning pulse signals included in the first scanning signal G1 in one period.

When the gate drive circuit 10 provided in the disclosure is applied to a display panel including a pixel drive circuit 51, a light emitting device 52 (as shown in FIG. 8), a scanning signal line "gate", and a data signal line "data", referring to FIG. 5, the output terminal "Output" of the shift register 13 is connected to the scanning signal line "gate", and the signal output by the output terminal "Output" is transmitted to the pixel drive circuit 51 through the scanning signal line "gate". Then, the pixel drive circuit 51 writes the data signal input from the data signal line "data" into the pixel drive circuit 51 according to the signal of the scanning signal line "gate" (the gate of the drive transistor T3 shown in FIG. 8, that is, the third node N3) to drive the light emitting device 52 to emit light.

Since the first scanning signal G1 has a plurality of scanning pulse signals in one period, when the gate drive circuit 10 provided in the disclosure is applied to a display panel, the pixel drive circuit 51 may perform, under the control of the first scanning signal G1, a plurality of voltage biases on the gate of the drive transistor T3 before the light emitting device 52 emits light, thereby compensating the threshold voltage of the drive transistor T3 for a plurality of times to enable the threshold voltage of the drive transistor T3 to shift negatively. In this way, the difference between the threshold voltages in the compensation stage and the light emitting stage is reduced, and the luminance of the display image is improved.

Figure 3:
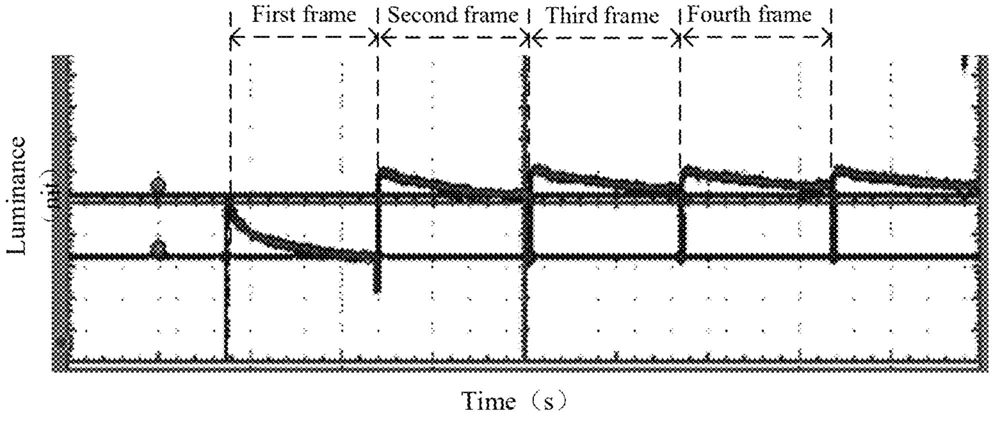
FIG. 3 illustrates a luminance curve of a first display panel over time.
Figure 4:
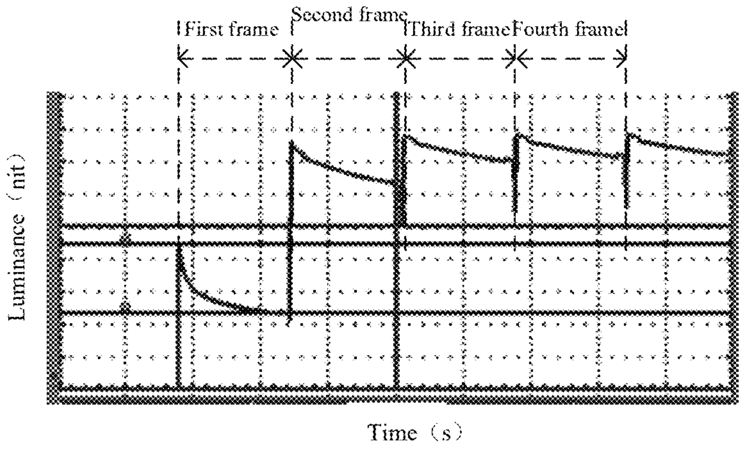
FIG. 4 illustrates a luminance curve of a second display panel over time.

The inventors have tested changes of the luminance over time of a plurality consecutive frames for the same image displayed by two display panels. The first display panel adopted the gate drive circuit provided in the present disclosure, and the test result thereof is shown in FIG. 3. The second display panel adopted the gate drive circuit in the related art (the output scanning signal includes one scanning pulse signal in one period), and the test result thereof is shown in FIG. 4. Among a plurality of consecutive frames of the same picture displayed on the display panel, the ratio of the luminance of the first frame to a preset frame is the FFR value. The preset frame may be any frame displayed after the same picture mentioned above is stably displayed. Here, the fourth frame is taken as the preset frame. As can be seen from a comparation between FIG. 3 and FIG. 4, both the initial luminance and the ending luminance of the first frame of the first display panel are greatly improved, and there is basically no difference in the luminance of the fourth frame of the two display panels. Therefore, by adopting the gate drive circuit 10 provided in the present disclosure, the FFR value of the display panel can be significantly improved, so that the ghosting occurred in the displaying of the first frame after the image is switched can be improved.

It should be noted that the first display stage may include a display stage for the first frame after the image is switched, and may also include a display stage for any frame that is stably displayed after the image is switched. As shown in FIG. 3, the first display stage includes display stages for the first frame to the fifth frame after the image is switched.

In some embodiments, the first display stage may be the entire display stage of the display panel, that is, the first frame start signal GSTV1 is used as the start signal of the cascade circuit 12 in the displaying of each frame in the entire display stage.

Figure 6:
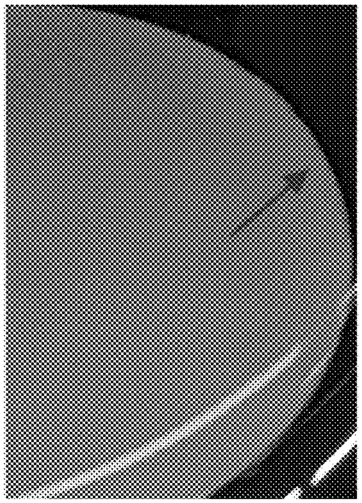
FIG. 6 illustrates blurred edge defect of a display panel.
Figure 7:
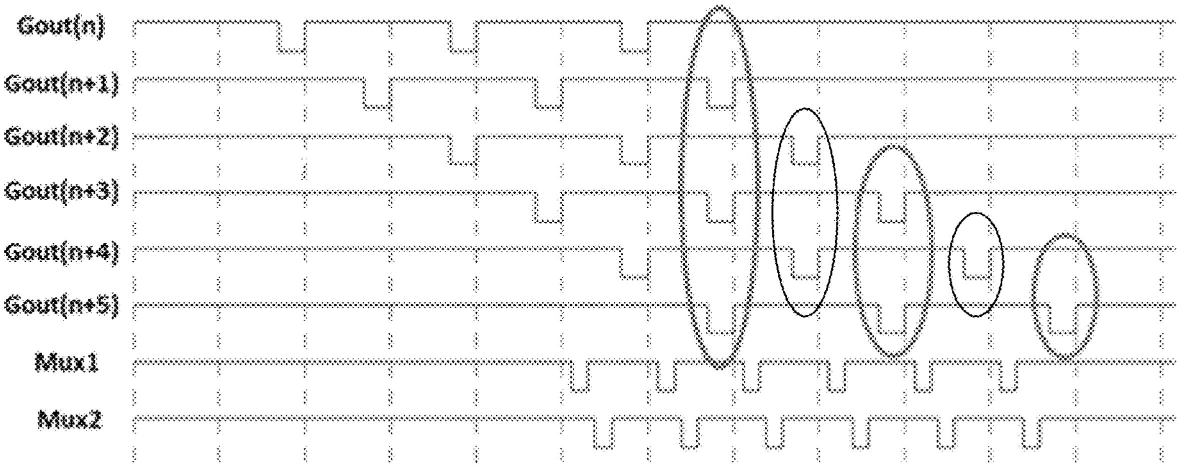
FIG. 7 is a sequence chart of driving signals of a display panel.

The inventors have found that when the first frame start signal GSTV1 is used as the start signal of the cascade circuit 12 throughout the entire display process, a "blurred edge" defect will occur at the edge of the display image, as shown in FIG. 6. The inventors analyzed this defect. In the display panel shown in FIG. 5, a plurality of pixel drive circuits 51 are arranged in rows and columns. Assuming that the (n+5)th row is the last row of pixel drive circuits 51, and the gate drive circuit 10 is driven by the first frame start signal GSTV1 shown in FIG. 2*a* during the entire display process, a sequence chart of the driving signals for driving the display panel as shown in FIG. 5 to display is shown in FIG. 7. When data signals are wrote into pixel drive circuits 51 in the (n+1)th row and the row previous to the (n+1)th row, the data signal line "data" will be used for simultaneously writing signals to 3 rows of pixel drive circuits 51, while when data signals are wrote into the pixel drive circuits 51 in the (n+2)th row to the (n+5)th row, the data signal line "data" will be used for writing signals to 2 rows or 1 row of pixel drive circuits 51 simultaneously. This causes the voltage of the third node N3 (i.e., the gate of the drive transistor T3) in the pixel drive circuits 51 from the (n+2)th row to the (n+5)th row near the edge to be relatively high, and a darkening phenomenon will occur in a bright image. As a result, a dark "blurred edge" occurs near the border, as shown in FIG. 6.

To avoid this abnormal display phenomenon, in some embodiments, as shown in FIG. 1, the gate drive circuit further includes a second frame start signal line 15. The second frame start signal line 15 is connected to a second input terminal "Input2" of the cascade circuit 12, and the second frame start signal line 15 is configured to transmit a second frame start signal GSTV2 to the cascade circuit 12 in the second display stage. Accordingly, the cascade circuit 12 is further configured to: output second scanning signals G2 stage by stage according to the second frame start signal GSTV2 and the clock signal GCK. The number of pulse signals of the clock signal GCK that overlap with the effective level of the second frame start signal GSTV2 in one period is less than the number of pulse signals of the clock signal GCK that overlap with the effective level of the first frame start signal GSTV1 in one period, and the number of scanning pulse signals included in the second scanning signal G2 in one period is greater than or equal to 1, and less than the number of scanning pulse signals included in the first scanning signal G1 in one period.

For example, in FIG. 2*a*, the effective level of the second frame start signal GSTV2 in one period overlaps with one pulse signal of the clock signal GCK. That is, the number of pulse signals of the clock signal GCK that overlap with the effective level of the second frame start signal GSTV2 in one period is 1.

For example, in the cascade circuit 12, the input terminal "Input" of the first-stage shift register GOA1 is connected to the second input terminal "Input2" of the cascade circuit 12, or multiplexed as the second input terminal "Input2" of the cascade circuit 12 (as shown in FIG. 1).

In the second display stage, the start signal of the first-stage shift register GOA1 is the second frame start signal GSTV2. In this way, in the second display stage, the cascade circuit 12 generates the second scanning signal G2 stage by stage under the action of the second frame start signal GSTV2 and the clock signal GCK. It can be understood that the number of pulse signals of the clock signal GCK that overlap with the effective level of the second frame start signal GSTV2 in one period is the same as the number of scanning pulse signals included in the second scanning signal G2 in one period. When the number of pulse signals of the clock signal GCK that overlap with the effective level of the second frame start signal GSTV2 in one period is 1, the cascade circuit 12 is triggered by the second frame start signal GSTV2, and outputs a second scanning signal G2 with one scanning pulse signal in one period.

In some embodiments, the voltage of the effective level of the second frame start signal GSTV2 is the same as that of the effective level of the first frame start signal GSTV1.

In some embodiments, the first display stage may be a display stage for the first frame after the image is switched, and the second display stage may be a display stage for any frame that is stably displayed after the image is switched, such as the display stage for the second frame, the display stage for the third frame, etc.

Figure 9:
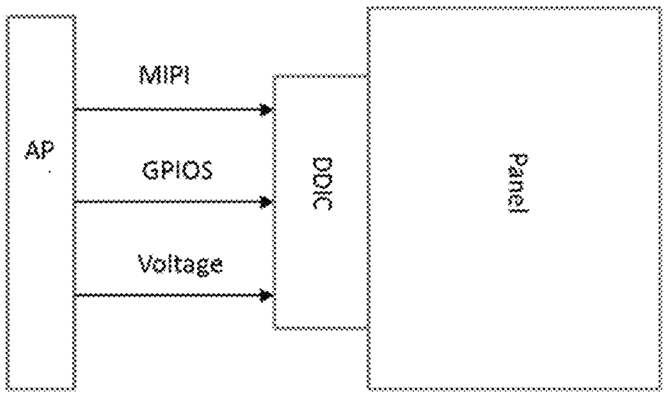
FIG. 9 is a schematic structural diagram of a display device provided by the present disclosure.

Reference is made to FIG. 9 which is a schematic structural diagram of a display device. As shown in FIG. 9, the display device includes a display driver integrated circuit (DDIC) and a display panel. The DDIC is connected to an application processor (AP) through a mobile industry processor interface (MIPI). When the display panel in the display device is the one shown in FIG. 5, the DDIC may start a judgment mechanism according to the display data sent from the AP end. For example, the DDIC may compare the display data of two adjacent frames, such as comparing the display data of the previous frame with that of the next frame. If the display data of the previous frame is different from that of the next frame (as shown in FIG. 2*a*, the display data of the previous frame is data A, and the display data of the next frame is data B), that is, the display data of the next frame is updated, this corresponds to the display of the first frame when the image is switched. In this case, steps in the first display stage are executed, the first frame start signal GSTV1 is used as the start signal of the first-stage shift register GOA1, and at the same time, the second frame start signal GSTV2 in the second frame start signal line 15 will automatically be in a high-impedance state (Hi-Z). If the display data of the previous frame is the same as that of the next frame, that is, the display data of the next frame is not updated and shows the same image as the previous frame, in this case, steps in the second display stage can be executed. The second frame start signal GSTV2 is used as the start signal of the first-stage shift register GOA1, and at the same time, the first frame start signal GSTV1 in the first frame start signal line 11 will automatically be in a high-impedance state (Hi-Z).

In this way, by performing different driving on the cascade circuit 12 in stages, the "blurred edge" defect can be solved. Moreover, the display luminance of the first frame when the image is switched can be improved, the FFR value can be increased, and the ghosting defect can be solved.

In some embodiments, the first frame start signal line 11 and the second frame start signal line 15 are provided independently, as shown in FIG. 1. Of course, the first frame start signal line 11 and the second frame start signal line 15 may also share the same signal line, which is not limited here.

This disclosure provides a display panel. As shown in FIG. 5 and FIG. 8, the display panel includes a plurality of pixel drive circuits 51 arranged in an array; a plurality of light emitting devices 52, where each of the light emitting devices 52 is connected to a pixel drive circuit 51 that is located in a pixel same as that the light emitting device is located; a plurality of scanning signal lines "gate", where the scanning signal lines "gate" are connected to the scanning signal terminals Vgate of the pixel drive circuits 51 in the same row; a plurality of data signal lines "data", where the data signal lines "data" are connected to the data signal terminals Vdata of the pixel drive circuits 51 in the same column; and the gate drive circuit 10 provided in any of the embodiments, where the output terminals "Output" of the plurality of shift registers 13 in the cascade circuit 12 are respectively connected to different scanning signal lines "gate".

Among them, the pixel drive circuit 51 is configured to: write the data signal of the data signal terminal Vdata into the pixel drive circuit 51 according to the signal of the scanning signal terminal Vgate, so as to drive the light emitting device 52 to emit light.

It can be understood that the display panel provided in the disclosure has the advantages of the above-mentioned gate drive circuit 10, which will not be elaborated here.

In some embodiments, as shown in FIG. 5, the plurality of data signal lines "data" include a first data signal line "data1" and a second data signal line "data2". The display panel further includes: a signal terminal Source, a first data selection circuit Mux1, and a second data selection circuit Mux2. The first data signal line "data1" is connected to the signal terminal Source through the first data selection circuit Mux1, and the second data signal line "data2" is connected to the signal terminal Source through the second data selection circuit Mux2.

For example, as shown in FIG. 5, the first data selection circuit Mux1 is a switching transistor that is turned on or turned off under the control of a control signal Mux1. The second data selection circuit Mux2 is also a switching transistor that is turned on or turned off under the control of a control signal Mux2. For example, in FIG. 5, the switching transistors in the first data selection circuit Mux1 and the second data selection circuit Mux2 are both P-type transistors.

In a specific implementation, as shown in FIG. 7, before the scanning pulse signals in the first scanning signal G1 and the second scanning signal G2, the first data selection circuit Mux1 is first controlled to be turned on (the low level of Mux1 as shown in FIG. 7), and the second data selection circuit Mux2 is controlled to be turned off (the high level of Mux2 as shown in FIG. 7), so that the data signal input from the signal terminal Source is written into a first data storage capacitor Cdata1 through the first data selection circuit Mux1 and the first data signal line "data1". One plate of the first data storage capacitor Cdata1 is connected to the first data signal line "data1". Then, the second data selection circuit Mux2 is controlled to be turned on (the low level of Mux2 as shown in FIG. 7), the first data selection circuit Mux1 is controlled to be turned off (the high level of Mux1 as shown in FIG. 7), so that the data signal input from the signal terminal Source is written into the second data storage capacitor Cdata2 through the second data selection circuit Mux2 and the second data signal line "data2". One plate of the second data storage capacitor Cdata2 is connected to the second data signal line "data2"

It should be noted that two data signal lines "data" share the same signal terminal Source, as shown in FIG. 5. However, in specific implementations, three or more data signal lines data may also share the same signal terminal Source, which is not limited herein.

In some embodiments, as shown in FIG. 8, the pixel drive circuit 51 includes a writing module 81 connected to the data signal terminal Vdata, the first node N1, and the scanning signal terminal Vgate. The writing module 81 is configured to write the data signal into the first node N1 during the compensation stage according to the signal of the scanning signal terminal Vgate.

For example, as shown in FIG. 8, the writing module 81 may include a fourth transistor T4 having a control electrode connected to the scanning signal terminal Vgate, a first electrode connected to the data signal terminal Vdata, and a second electrode connected to the first node N1.

In some embodiments, the pixel drive circuit 51 includes a driving module 82 that is connected to the first node N1, the second node N2 and the third node N3, and the driving module 82 is configured to write the signal of the first node N1 into the second node N2 under the control of the potential of the third node N3.

For example, as shown in FIG. 8, the driving module 82 may include a drive transistor T3 having a control electrode connected to the third node N3, a first electrode connected to the first node N1, and a second electrode connected to the second node N2.

In some embodiments, the pixel drive circuit 51 includes a compensation module 83 that is connected to the second node N2, the third node N3, and the scanning signal terminal Vgate, and the compensation module 83 is configured to write, according to the signal of the scanning signal terminal Vgate, the signal of the second node N2 into the third node N3 during the compensation stage.

For example, as shown in FIG. 8, the compensation module 83 may include a second transistor T2 having a control electrode connected to the scanning signal terminal Vgate, a first electrode connected to the second node N2, and a second electrode connected to the third node N3.

In some embodiments, the pixel drive circuit 51 includes an emission control module 84 that is connected to a first voltage terminal ELVDD, an enabling signal terminal EM, the first node N1, the second node N2 and the light emitting device 52. The emission control module 84 is configured to: in the emission stage, cooperate with the driving module 82 according to the enabling signal terminal EM's enabling signal so as to drive the light emitting device 52 to emit light.

For example, as shown in FIG. 8, the emission control module 84 may include a fifth transistor T5 and a sixth transistor T6. The fifth transistor T5 has a control electrode connected to the enabling signal terminal EM, a first electrode connected to the first voltage terminal ELVDD, and a second electrode connected to the first node N1. The sixth transistor T6 has a control electrode connected to the enabling signal terminal EM, a first electrode connected to the second node N2, and a second electrode connected to an anode of the light emitting device 52.

In some embodiments, the pixel drive circuit 51 includes a storage module 85 that is connected to the first voltage terminal ELVDD and the third node N3, and the storage module 85 is configured to store the signal of the third node N3.

For example, as shown in FIG. 8, the storage module 85 includes a first capacitor Cst having a first electrode connected to the first voltage terminal ELVDD and a second electrode connected to the third node N3.

In some embodiments, the pixel drive circuit 51 includes a first reset module 86 that is connected to the third node N3, a first reset signal terminal Vint1 and a reset control signal terminal Reset. The first reset module 86 is configured to write the signal of the first reset signal terminal Vint1 into the third node N3 according to the signal of the reset control signal terminal Reset.

For example, as shown in FIG. 8, the first reset module 86 includes first transistor T1 having a control electrode connected to the reset control signal terminal Reset, a first electrode connected to the first reset signal terminal Vint1, and a second electrode connected to the third node N3.

In some embodiments, the pixel drive circuit 51 includes a second reset module 87 that is connected to the anode of the light emitting device 52, a second reset signal terminal Vint2 and the scanning signal terminal Vgate. The second reset module 87 is configured to write the signal of the second reset signal terminal Vint2 into the anode of the light emitting device 52 according to the signal of the scanning signal terminal Vgate.

For example, as shown in FIG. 8, the second reset module 87 includes a seventh transistor T7 having a control electrode connected to the scanning signal terminal Vgate, a first electrode connected to the second reset signal terminal Vint2, and a second electrode connected to the anode of the light emitting device 52.

For example, in FIG. 8, the first transistor T1 to the seventh transistor T7 are all P-type transistors. Of course, the first transistor T1 to the seventh transistor T7 may also be N-type transistors, which is not limited herein.

In order to ensure that the human eye cannot perceive the ghosting phenomenon of the first frame of the switched image, in some embodiments, among a plurality of consecutive frames of the same picture displayed on the display panel, the ratio of the luminance of the first frame to the preset frame is the first frame ratio FFR, and the first frame ratio is greater than or equal to 85%, and the preset frame is any frame that is displayed after the same image is stably displayed.

As shown in FIG. 9, The present disclosure provides a display device, including: a display panel provided in any of the embodiments; and a display driver integrated circuit (DDIC). The display driver integrated circuit DDIC is connected to the display panel, and is used to provide driving signals to the display panel. The driving signals include the first frame start signal, the clock signal, and the data signal.

It can be understood that the display device provided in the disclosure has the advantages of the above-mentioned gate drive circuit 10, which is not elaborated here.

The display device provided by the present disclosure may be a mobile phone, a tablet computer, a television, a monitor, a laptop computer, or any product or component with a display function such as a digital photo frame, or a navigator.

As shown in FIG. 9, the DDIC is connected to an application processor (AP) through a mobile industry processor interface (MIPI).

In some embodiments, the driving signals may also include the second frame start signal and the like.

The present disclosure provides a display drive method that is applied to a display panel provided in any of the embodiments (as shown in FIG. 5). The display drive method includes steps described below.

At step S01, a clock signal GCK is provided to the clock signal line 14, and transmitted to the shift register 13 by the clock signal line 14.

At step S02, in the first display stage, a first frame start signal GSTV1 is provided to the first frame start signal line 11, and transmitted to the cascade circuit 12 by the first frame start signal line 11. The cascade circuit 12 outputs first scanning signals G1 stage by stage according to the first frame start signal GSTV1 and the clock signal GCK.

The display drive method provided by the present disclosure may be executed by the display driver integrated circuit (DDIC) in the display device.

In some embodiments, as shown in FIG. 5, when the gate drive circuit further includes a second frame start signal line 15, and the second frame start signal line 15 is connected to the second input terminal "Input2" of the cascade circuit 12, the method further includes steps described below after step S01.

At step S11, in the second display stage, a second frame start signal GSTV2 is provided to the second frame start signal line 15, and transmitted to the cascade circuit 12 by the second frame start signal line 15. The cascade circuit 12 outputs second scanning signals G2 stage by stage according to the second frame start signal GSTV2 and the clock signal GCK.

In some embodiments, before step S02 and step S11, the method further includes steps described below.

At step S21, display data is obtained. The display data includes the display data of the previous frame and the display data of the next frame. The display data of the previous frame and the display data of the next frame are the display data of two adjacent frames.

At step S22, the display data of the previous frame is compared with the display data of the next frame, and the steps in the first display stage or the steps in the second display stage are executed according to the comparison result.

In some embodiments, step S22, in which the steps in the first display stage or the steps in the second display stage are executed according to the comparison result, includes steps described below.

At step S31, if the display data of the previous frame is different from the display data of the next frame, the steps in the first display stage are executed.

At step S32, if the display data of the previous frame is the same as that of the next frame, the steps in the second display stage are executed.

Figure 10:
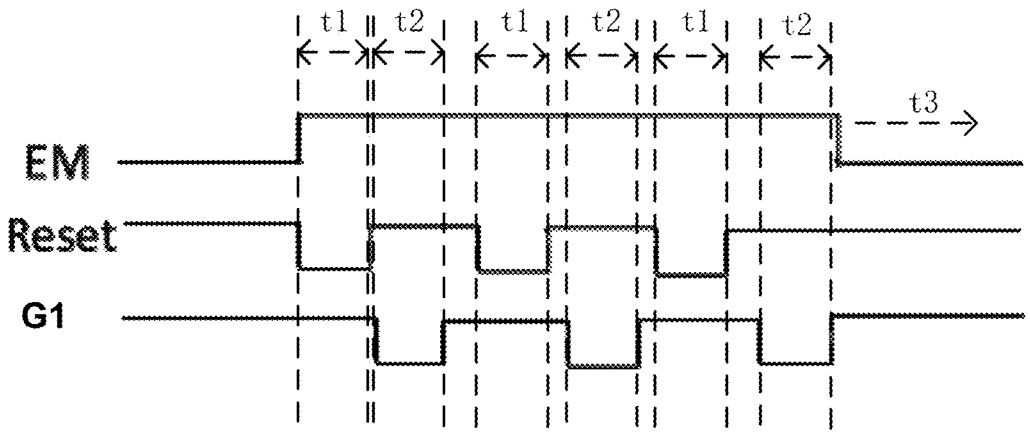
FIG. 10 is a first sequence chart of driving signals of a pixel drive circuit.

In some embodiments, as shown in FIG. 10, the first scanning signal G1 includes a plurality of scanning pulse signals. The plurality of scanning signal lines "gate" include a first scanning signal (G1) line. The plurality of data signal lines "data" include a first data signal line "data1". The pixel drive circuit 51 connected to the first scanning signal (G1)

line and the first data signal line "data1" is the first pixel drive circuit 51. After step S02, the method further includes steps described below.

At step S41, a plurality of compensation stages separated from each other are included. In each compensation stage, a scanning pulse signal is provided to the scanning signal terminal Vgate of the first pixel drive circuit 51, and a data signal is provided to the data signal terminal Vdata of the first pixel drive circuit 51, so that the data signal is written into the first pixel drive circuit 51.

In each compensation stage, the gate of the drive transistor T3 can be biased once, and the threshold voltage of the drive transistor T3 can be compensated for a plurality of times in the compensation stages, so that the threshold voltage of the drive transistor T3 shift negatively.

Figure 11:
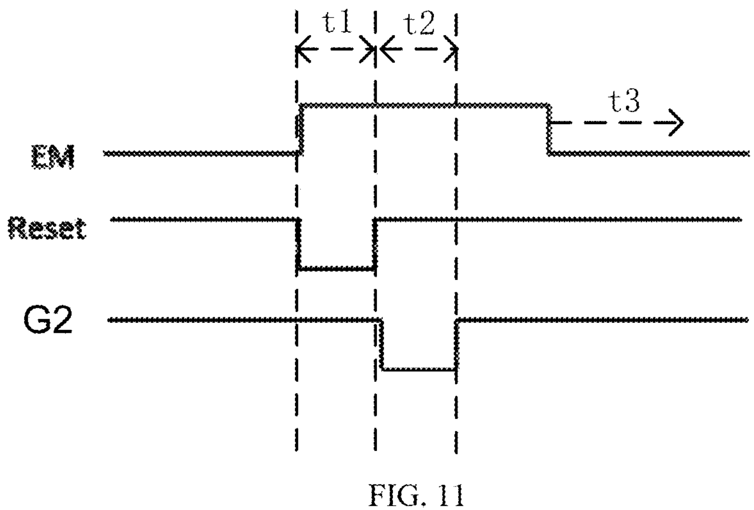
FIG. 11 is a second sequence chart of driving signals of a pixel drive circuit.

In some embodiments, as shown in FIG. 11, the second scanning signal G2 includes one scanning pulse signal. The plurality of scanning signal lines "gate" include a first scanning signal (G1) line. The plurality of data signal lines "data" include a first data signal line "data1".

The pixel drive circuit 51 connected to the first scanning signal (G1) line and the first data signal line "data1" is the first pixel drive circuit 51. After step S11, the method further includes one compensation stage, in which a scanning pulse signal is provided to the scanning signal terminal Vgate of the first pixel drive circuit 51, and a data signal is provided to the data signal terminal Vdata of the first pixel drive circuit 51, so that the data signal is written into the first pixel drive circuit 51.

In some embodiments, as shown in FIG. 5, the plurality of data signal lines "data" also include a second data signal line "data2". The display panel also includes a signal terminal Source, a first data selection circuit Mux1, and a second data selection circuit Mux2. The first data signal line "data1" is connected to the signal terminal Source through the first data selection circuit Mux1, and the second data signal line "data2" is connected to the signal terminal Source through the second data selection circuit Mux2. As shown in FIG. 7, in step S41, before various compensation stages, the following steps are also included.

At step S51, a data signal is provided to the signal terminal Source to control the first data selection circuit Mux1 to be turned on and control the second data selection circuit Mux2 to be turned off, so that the data signal is written into the first data storage capacitor Cdata1 with one plate thereof being connected to the first data signal line "data1".

In specific implementation, as shown in FIG. 10 and FIG. 7, in step S41, before the compensation stages, the following actions may also be included: providing a data signal to the signal terminal Source, controlling the second data selection circuit Mux2 to be turned on, and controlling the first data selection circuit Mux1 to be turned off, so that the data signal is written into the second data storage capacitor Cdata2 with one plate thereof being connected to the second data signal line "data2".

In some embodiments, as shown in FIG. 8, when the first pixel drive circuit 51 includes a writing module 81, a driving module 82, a compensation module 83, an emission control module 84, and a first reset module 86, and the writing module 81 is connected to the data signal terminal Vdata, the first node N1 and the scanning signal terminal Vgate, the driving module 82 is connected to the first node N1, the second node N2 and the third node N3, the compensation module 83 is connected to the second node N2, the third node N3 and the scanning signal terminal Vgate, the emission control module 84 is connected to the first voltage terminal ELVDD, the enabling signal terminal EM, the first node N1, the second node N2 and the light emitting device 52, and the first reset module 86 is connected to the third node N3, the first reset signal terminal Vint1 and the reset control signal terminal Reset, in the compensation stage t2, the data signal is wrote into the first node N1, the second node N2 and the third node N3 in sequence. As shown in FIG. 10 and FIG. 11, in step S41, before each compensation stage t2, the following step may further be included.

At step S61, in reset stage t1, a first reset signal is provided to the first reset signal terminal Vint1, and a reset control signal (Reset as shown in FIG. 10 and FIG. 11) is provided to the reset control signal terminal "Reset", so that the first reset signal is written into the third node N3.

As shown in FIG. 10, after the plurality of compensation stages t2 in step S41, or as shown in FIG. 11, after the single compensation stage t2, the following step may further be included.

At step S71, in the emission stage t3, an enabling signal (EM as shown in FIG. 10 and FIG. 11) is provided to the enabling signal terminal "EM", so that the emission control module 84 cooperates with the driving module 82 to drive the light emitting device 52 to emit light.

It should be noted that the display drive method may also include more steps, which can be determined according to actual requirements and is not limited in the present disclosure. For detailed descriptions and technical effects of the display drive method, reference can be made to the descriptions of the gate drive circuit and the display panel described above, and they will not be elaborated here.

In the present disclosure, "a plurality of" means two or more, and "at least one" means one or more, unless otherwise it is specifically defined.

In the present disclosure, orientation or positional relationships indicated by terms such as "up" and "down" are based on the orientation or positional relationships shown in the accompanying drawings, and are only for the convenience of describing this disclosure and simplifying the description, rather than indicating or implying that the referred device or element must have a specific orientation, be constructed and operated in a specific orientation. Therefore, it should not be understood as a limitation to the disclosure.

Herein, terms such as "comprise/include", "contain" or any other variants are intended to cover non-exclusive inclusion, so that a process, method, commodity or device including a series of elements not only includes those elements, but also includes other elements not explicitly listed, or also includes elements inherent to such a process, method, product or device. In the absence of more restrictions, an element defined by the statement "including one . . . " does not exclude the existence of other identical elements in the process, method, commodity or device including the element.

Terms such as "an embodiment", "some embodiments", "exemplary embodiments", "one or more embodiments", "example", "one example", "some examples" herein are intended to indicate that specific features, structures, materials or characteristics related to the embodiment or example are included in at least one embodiment or example of the disclosure. The schematic representation of the above terms does not necessarily refer to the same embodiment or example. In addition, the specific features, structures, materials or characteristics may be included in any one or more embodiments or examples in any appropriate way.

Herein, relational terms such as "first" and "second" are only used to distinguish one entity or operation from another entity or operation, and do not necessarily require or imply any actual relationship or order between these entities or operations.

In describing some embodiments, expressions such as “coupled” and “connected” may be used. For example, when describing some embodiments, the term “connected” may be used to indicate that two or more components have direct physical contact or electrical contact with each other. Also, when describing some embodiments, the term “coupled” may be used to indicate that two or more components have direct physical contact or electrical contact with each other. However, the term “coupled” or “communicatively coupled” may also mean that two or more components have no direct contact with each other, but still cooperate or interact with each other. The embodiments disclosed here are not necessarily limited to the content of the text.

“At least one of A, B and C” has the same meaning as “at least one of A, B or C”, and both of them include the following combinations of A, B and C: only A, only B, only C, the combination of A and B, the combination of A and C, the combination of B and C, and the combination of A, B and C.

“A and/or B” includes the following three combinations: only A, only B, and the combination of A and B.

The term “if” as used herein may optionally be interpreted, depending on the context, to mean “when . . . ”, “at . . . ”, “in response to determining” or “in response to detecting”. Similarly, depending on the context, the phrase “if it is determined . . . ” or “if it is detected [stated condition or event]” may optionally be interpreted to mean “when determining . . . ”, “in response to determining . . . ”, “when detecting [stated condition or event]” or “in response to detecting [stated condition or event]”.

The phrase “used for” or “configured to” as used herein implies open and inclusive language, which does not exclude devices applicable to or configured to perform additional tasks or steps.

The phrase “based on” or “according to” as used herein implies open and inclusive. A process, step, calculation or other action based on one or more of the stated conditions or values may be based on other conditions or exceed the stated values in practice. A process, step, calculation or other action according to one or more of the stated conditions or values may be according to other conditions or exceed the stated values in practice.

The phrases “about”, “approximately” or “nearly” as used herein include the stated value and the average value within an acceptable deviation range of a specific value, where the acceptable deviation range is determined by considering the measurement being discussed and the error related to the measurement of a specific quantity (i.e., the limitations of the measurement system) by an ordinary person in the field.

As used herein, “parallel”, “vertical”, “equal”, “flush” include the stated situation and situations similar to the stated situation, where the range of the similar situation is within an acceptable deviation range, and the acceptable deviation range is determined by considering the measurement being discussed and the error related to the measurement of a specific quantity (i.e., the limitations of the measurement system) by those skilled in the art. For example, “parallel” includes absolute parallel and approximate parallel, where the acceptable deviation range for approximate parallel is, for example, a deviation within 5°. “Vertical” includes absolute vertical and approximate vertical, where the acceptable deviation range for approximate vertical is, for example, a deviation within 5°. “Equal” includes absolute equal and approximate equal, where the acceptable deviation range for approximate equal is, for example, the difference between the two being equal is less than or equal to 5% of either of them. “Flush” includes absolute flush and approximate flush, where the acceptable deviation range for approximate flush is, for example, the distance between the two being flush is less than or equal to 5% of the size of either of them.

It should be understood that when a layer or element is said to be on another layer or substrate, it may mean that the layer or element is directly located on the other layer or substrate, or there may be an intermediate layer between the layer or element and the other layer or substrate.

Exemplary embodiments are described with reference to sectional views and/or plan views as idealized exemplary drawings herein. In the drawings, for clarity, the thicknesses of layers and regions are enlarged. Therefore, it can be envisaged that there are shape changes relative to the drawings due to, for example, manufacturing techniques and/or tolerances. Therefore, exemplary embodiments should not be interpreted as being limited to the shape of the region shown herein, but include shape deviations caused by, for example, manufacturing. For example, an etched region shown as rectangular will usually have a curved feature. Therefore, the regions shown in the drawings are essentially schematic, and their shapes are not intended to show the actual shape of the device region, and are not intended to limit the scope of the exemplary embodiments.

Finally, it should be noted that the above embodiments are only used to illustrate the technical solution of the disclosure, rather than limiting it. Although the disclosure has been described in detail with reference to the foregoing embodiments, those skilled in the art should understand that modifications can be made to the technical solutions described in the foregoing embodiments, or equivalent substitutions can be made to some of the technical features. However, these modifications or substitutions do not cause the essence of the corresponding technical solutions to deviate from the spirit and scope of the technical solutions of the embodiments of the present disclosure.

The invention claimed is:

1. A gate drive circuit, comprising: a first frame start signal line and a cascade circuit;

wherein the first frame start signal line is connected to a first input terminal of the cascade circuit, and is configured to transmit a first frame start signal to the cascade circuit in a first display stage;

the cascade circuit comprises a plurality of shift registers cascaded with each other, wherein each of the shift registers is connected to a clock signal line, and the output terminal of each of the shift registers is connected to a writing module in a pixel drive circuit; wherein the cascade circuit is configured to output first scanning signals stage by stage according to the first frame start signal and a clock signal input from the clock signal line;

wherein an effective level of the first frame start signal in one period overlaps with a plurality of pulse signals of the clock signal, and each of the first scanning signals comprises a plurality of scanning pulse signals in one period; the writing module is configured to write a data signal into the pixel drive circuit based on the first scanning signal;

a second frame start signal line connected to a second input terminal of the cascade circuit, wherein the second frame start signal line is configured to transmit a second frame start signal to the cascade circuit in a second display stage;

wherein the cascade circuit is further configured to output second scanning signals stage by stage according to the second frame start signal and the clock signal;

wherein a number of pulse signals of the clock signal that overlap with the effective level of the second frame start signal in one period is less than a number of pulse signals of the clock signal that overlap with the effective level of the first frame start signal in one period, and a number of scanning pulse signals comprised in the second scanning signal in one period is greater than or equal to 1, and less than a number of scanning pulse signals comprised in the first scanning signal in one period.

2. The gate drive circuit according to claim 1, wherein the first frame start signal line and the second frame start signal line are provided independently, or share a same signal line.

3. The gate drive circuit according to claim 1, wherein the number of pulse signals of the clock signal that overlap with the effective level of the first frame start signal in one period is greater than or equal to 2, and less than or equal to 5.

4. The gate drive circuit according to claim 1, wherein the effective level of the second frame start signal in one period overlaps with one pulse signal of the clock signal.

5. The gate drive circuit according to claim 1, wherein the effective level of the first frame start signal is a low level.

6. The gate drive circuit according to claim 1, wherein the effective level of the second frame start signal and the effective level of the first frame start signal are at a same voltage.

7. The gate drive circuit according to claim 1, wherein in the cascade circuit, an signal input terminal of a first-stage shift register is connected to the first input terminal and the second input terminal, an output terminal of an E-th-stage shift register is connected to the signal input terminal of an (E+F)th-stage shift register, and the output terminal of a Mth-stage shift register is connected to a reset signal input terminal of a (M−N)th-stage shift register, where $1 \le E < H$, $F \ge 1$, $E+F \le H$, $1 < M < H$, $1 \le N < M$, and E, F, H, M and N are all positive integers, and His a total number of the shift registers in the cascade circuit.

8. A display panel, comprising:

a plurality of pixel drive circuits arranged in an array;

a plurality of light emitting devices, wherein each of the light emitting devices is connected to a pixel drive circuit located in a pixel same as the pixel in which the light emitting device is located;

a plurality of scanning signal lines, wherein each of the scanning signal lines is connected to scanning signal terminals of the pixel drive circuits located in a same row;

a plurality of data signal lines, wherein each of the data signal line is connected to data signal terminals of the pixel drive circuit located in a same column; and the gate drive circuit according to claim 1, wherein output terminals of the plurality of shift registers in the cascade circuit are respectively connected to different scanning signal lines;

wherein the pixel drive circuit is configured to: write a data signal of the data signal terminal into the pixel drive circuit according to a signal of the scanning signal terminal, so as to drive the light emitting device to emit light.

9. The display panel according to claim 8, wherein the plurality of data signal lines comprises a first data signal line and a second data signal line, the display panel further comprises a signal terminal, a first data selection circuit and a second data selection circuit, the first data signal line is connected to the signal terminal through the first data selection circuit, and the second data signal line is connected to the signal terminal through the second data selection circuit.

10. The display panel according to claim 8, wherein the pixel drive circuit comprises:

a writing sub-circuit, connected to the data signal terminal, a first node and the scanning signal terminal, and configured to: in a compensation stage, write the data signal into the first node in response to a signal of the scanning signal terminal;

a driving sub-circuit, connected to the first node, a second node and a third node, and configured to write the signal of the first node into the second node based on a potential of the third node;

a compensation sub-circuit, connected to the second node, the third node and the scanning signal terminal, and configured to: in the compensation stage, write a signal of the second node into the third node according to the signal of the scanning signal terminal; and an emission control sub-circuit, connected to a first voltage terminal, an enabling signal terminal, the first node, the second node, and the light emitting device, and configured to: in an emission stage, cooperate with the driving sub-circuit according to an enabling signal of the enabling signal terminal to drive the light emitting device to emit light;

a storage sub-circuit, connected to the first voltage terminal and the third node, and configured to store the signal of the third node;

a first reset sub-circuit, connected to the third node, a first reset signal terminal and a reset control signal terminal, and configured to: write a signal of the first reset signal terminal into the third node according to a signal of the reset control signal terminal; and a second reset sub-circuit, connected to an anode of the light emitting device, a second reset signal terminal, and the scanning signal terminal, and configured to write a signal of the second reset signal terminal into the anode of the light emitting device according to the signal of the scanning signal terminal.

11. The display panel according to claim 8, wherein, among a plurality of consecutive frames of a same picture displayed on the display panel, a ratio of luminance of a first frame to the luminance of a preset frame is a first frame ratio, the first frame ratio is greater than or equal to 85%, and the preset frame is any frame displayed after the same picture is stably displayed.

12. A display device, comprising:

the display panel according to claim 8; and a display driving chip, connected to the display panel, and configured to provide driving signals to the display panel, wherein the driving signals comprise the first frame start signal, the clock signal, and the data signal.

13. A display drive method, applied to the display panel according to claim 8, the display drive method comprising:

providing a clock signal to the clock signal line, and transmitting the clock signal to the shift registers by the clock signal line;

in a first display stage, providing a first frame start signal to the first frame start signal line, and transmitting the first frame start signal to the cascade circuit by the first frame start signal line, so that the cascade circuit outputs the first scanning signals stage by stage according to the first frame start signal and the clock signal.

14. The display drive method according to claim 13, wherein when the gate drive circuit further comprises a second frame start signal line connected to a second input terminal of the cascade circuit, after providing a clock signal to the clock signal line, the method further comprises a second display stage;

in the second display stage, a second frame start signal is provided to the second frame start signal line, and the second frame start signal is transmitted to the cascade circuit by the second frame start signal line, so that the cascade circuit outputs second scanning signals stage by stage according to the second frame start signal and the clock signal.

15. The display drive method according to claim 14, wherein before providing the first frame start signal to the first frame start signal line and providing the second frame start signal to the second frame start signal line, the method further comprises:

obtaining display data, wherein the display data comprises display data of a previous frame of and display data of a next frame, and the display data of the previous frame and the display data of the next frame are display data of two adjacent frames of pictures;

comparing the display data of the previous frame with the display data of the next frame, and executing steps in the first display stage or steps in the second display stage according to a comparison result.

16. The display drive method according to claim 15, wherein the executing steps in the first display stage or steps in the second display stage according to the comparison result comprises:

in response to the display data of the previous frame being different from the display data of the next frame, executing the steps in the first display stage;

in response to the display data of the previous frame being the same as the display data of the next frame, executing the steps in the second display stage.

17. The display drive method according to claim 13, wherein the first scanning signal comprises a plurality of scanning pulse signals, the plurality of scanning signal lines comprise a first scanning signal line, the plurality of data signal lines comprise a first data signal line, a pixel drive circuit connected to the first scanning signal line and the first data signal line is a first pixel drive circuit, and after the step, in which providing the first frame start signal to the first frame start signal line, and transmitting the first frame start signal to the cascade circuit by the first frame start signal line, so that the cascade circuit outputs the first scanning signals stage by stage according to the first frame start signal and the clock signal, the method further comprises a plurality of compensation stages spaced apart from each other, in each of the compensation stages, the scanning pulse signal is provided to the scanning signal terminal of the first pixel drive circuit, and a data signal is provided to the data signal terminal of the first pixel drive circuit, so that the data signal is written into the first pixel drive circuit.

18. The display drive method according to claim 17, wherein the plurality of data signal lines further comprises a second data signal line, the display panel further comprises a signal terminal, a first data selection circuit and a second data selection circuit, the first data signal line is connected to the signal terminal through the first data selection circuit, and the second data signal line is connected to the signal terminal through the second data selection circuit, before each of the compensation stages, the method further comprises:

providing the data signal to the signal terminal to control the first data selection circuit to be turned on and control the second data selection circuit to be turned off, so that the data signal is written into a first data storage capacitor, wherein one electrode plate of the first data storage capacitor is connected to the first data signal line.

19. The display drive method according to claim 17, wherein when the first pixel drive circuit comprises a writing sub-circuit, a driving sub-circuit, a compensation sub-circuit, an emission control sub-circuit and a first reset sub-circuit, and the writing sub-circuit is connected to the data signal terminal, the first node and the scanning signal terminal; the driving sub-circuit is connected to the first node, the second node and the third node, the compensation sub-circuit is connected to the second node, the third node and the scanning signal terminal, the emission control sub-circuit is connected to the first voltage terminal, the enabling signal terminal, the first node, the second node and the light emitting device, and the first reset sub-circuit is connected to the third node, the first reset signal terminal and the reset control signal terminal, the compensation stages are used for sequentially writing the data signal into the first node, the second node and the third node, and before each of the compensation stages, the method further comprises a reset stage, in the reset stage, a first reset signal is provided to the first reset signal terminal, and a reset control signal is provided to the reset control signal terminal, so that the first reset signal is written into the third node;

after the plurality of compensation stages, the method further comprises an emission stage;

in the emission stage, an enabling signal is provided to the enabling signal terminal, so that the emission control sub-circuit cooperates with the driving sub-circuit to drive the light emitting device to emit light.

* * * * *